2,915,511
HYDROXYLATED POLYSTYRENES

Joseph A. Blanchette, East Longmeadow, Mass., assignor to Monsanto Chemical Company, St. Louis, Mo., a corporation of Delaware No Drawing. Application November 27, 1956
Serial No. 624,499

5 Claims. (Cl. 260—93.5)

This invention relates to new polystyrene derivatives containing reactive groups. More particularly, the invention relates to reduced p-acylated polystyrenes.

Polystyrenes have found wide application in the plastics industry. However, for many applications it is necessary or desirable that a polymer contain reactive groups. It has now been found that certain polystyrenes may be modified to form reactive group-containing polymers having a variety of uses, particularly as film-forming materials and as chemical intermediates.

One object of this invention is to provide new polystyrene derivatives containing reactive groups.

Another object is to provide reduced p-acylated polystyrenes.

A further object is to provide processes for preparing such reduced polymers.

These and other objects are attained by reducing a p-acylated homopolymer of a styrene compound.

The following examples are given to illustrate the invention. Parts mentioned are parts by weight.

Example I

A styrene homopolymer having a molecular weight of about 30,000 is acetylated by a Friedel-Crafts reaction to form a polymer containing one acetyl group per aromatic ring. The acetylated polystyrene is dissolved in tetrahydrofuran to form a solution of 5 parts of polymer in 44 parts of solvent.

A reaction vessel is charged with a suspension of 5 parts of lithium aluminum hydride in 44 parts of tetrahydrofuran. The polymer solution is added to the suspension with agitation under such conditions that the reaction mixture begins to reflux gently. When all of the polymer solution has been added, the reaction mixture is refluxed for an additional 1–2 hours. The resultant polymer-lithium aluminum hydride complex is decomposed by pouring into ice water containing 10 parts of concentrated hydrochloric acid. The polymer is removed from the reaction mixture by filtration and dissolved in methyl ethyl ketone. This solution is added dropwise to water to reprecipitate the polymer. Infrared analysis of the product shows that all of the carbonyl groups of the acetylated polystyrene have been converted to hydroxyl groups and that none of the benzene rings have been hydrogenated. The product is dissolved in dioxane to form a solution of 50 parts of polymer in 50 parts of solvent. The solution is cast onto a glass plate to form a clear, flexible film.

Example II

A styrene homopolymer having a molecular weight of about 35,000 is stearylated by a Friedel-Crafts reaction to form a polymer containing one stearyl group per aromatic ring. The stearylated polystyrene is dissolved in tetrahydrofuran to form a solution of 5 parts of polymer in 135 parts of solvent. A reaction vessel is charged with this solution, and a suspension of 5 parts of lithium aluminum hydride in 44 parts of tetrahydrofuran is added to the solution with agitation under such conditions that the reaction mixture begins to reflux gently. When all of the lithium aluminum hydride suspension has been added, the reaction mixture is refluxed for an additional 1–2 hours. The resultant polymer-lithium aluminum hydride complex is decomposed by pouring into ice water containing 10 parts of concentrated hydrochloric acid. The polymer is removed from the reaction mixture by filtration and dissolved in methyl ethyl ketone. This solution is added dropwise to water to reprecipitate the polymer. Infra-red analysis of the product shows that all of the carbonyl groups of the stearylated polystyrene have been converted to hydroxyl groups and none of the benzene rings have been hydrogenated. The waxy product is useful as a lubricant.

The acylated polystyrenes which are reduced to form the products of this invention are styrene homopolymers which are substituted on the para-positions of the aromatic rings with aliphatic acyl radicals containing 2–24 carbon atoms. They may be prepared by reacting the appropriate acid anhydride or acid halide with a homopolymer of a styrene compound such as styrene, alpha-methyl styrene, and ar-substituted derivatives thereof wherein the ar-substituents may be hydroxyl radicals or aliphatic hydrocarbon radicals containing 1–4 carbon atoms such as para-hydroxy styrene, ortho- or para-methyl, ethyl, butyl, etc., styrenes, or para-dimethyl styrene, etc. This reaction is accomplished in a suitable solvent medium such as carbon disulfide in the presence of a Friedel-Crafts catalyst. The styrene homopolymers, before acylation, have molecular weights ranging from about 10,000 to 60,000. The degree of acylation may be controlled to yield products containing 0.1–1 acyl radical per aromatic ring. The reduced polymers obtained from polystyrenes in which 50–100% of the aromatic rings have been acylated form a preferred embodiment of this invention.

The products of this invention are hydroxylated polystyrenes derived from p-acylated polystyrenes by reduction of the p-acyl groups under conditions precluding the reduction of the benzene rings. The number of hydroxyl radicals in the hydroxylated polystyrenes may be varied by varying the degree of acylation of the styrene homopolymer and the degree of reduction of the acylated polymer. The hydroxylated polymers are soluble in common organic solvents such as alcohols, esters, ethers, ketones, hydrocarbons, tetrahydrofuran, etc.

The p-acylated polystyrenes may be reduced by the process used in the examples; i.e., by reduction with lithium aluminum hydride, or by any of the other conventional reduction techniques; e.g., by hydrogenation over metallic hydrogenation catalysts such as Raney nickel, copper-chromium oxide, etc. When the polymers are reduced with lithium aluminum hydride, 1–3 mols of reducing agent are used per mol of acylated polymer unit. The reaction is accomplished in a solvent for the acylated polymer such as tetrahydrofuran, dioxane, diethyl ether, benzene, etc., at reflux temperatures. The polymer-lithium aluminum hydride complex which is formed is decomposed by the use of a hydrolyzing agent, e.g., water, ethanol, ethyl acetate, etc. Using this procedure, no reduction of the benzene ring occurs. When the acylated polystyrenes are reduced by hydrogenation over metallic hydrogenation catalysts, the reaction is restricted to reduction of the acyl groups by operating at temperatures between room temperature (circa 25° C.) and about 100° C. under pressures of less than 10 atmospheres to cause reduction of the carbonyl groups without substantial reduction of the aromatic rings.

Compositions containing the polymers of this invention may be modified by the incorporation of conventional additives such as dyes, pigments, fillers, extenders, etc. The polymers may be used alone or in combination with other polymeric materials, e.g., with other vinylidene polymers.

The polymers of this invention are useful in forming fibers, filaments, films, sheets, molding compositions, textile treating compositions, lubricating compositions, etc. They are particularly useful in coating compositions for various surfaces such as wood, paper, metal, textiles, etc. Coatings containing these polymers are characterized by good properties of flexibility and adherence.

The presence of the hydroxyl groups makes these polymers useful as precursors for further chemically modified polymers. For example, they may be reacted with polybasic acids or anhydrides to form alkyd type resins.

It is obvious that many variations may be made in the products and processes set forth above without departing from the spirit and scope of this invention.

What is claimed is:

1. A p-substituted homopolymer of a styrene compound of the group consisting of styrene and alpha-methyl styrene, said homopolymer being substituted on the para-positions of 50–100% of the aromatic rings with an alpha-hydroxy aliphatic hydrocarbon radical containing 2–24 carbon atoms, said homopolymer before substitution on the para-positions having a molecular weight between about 10,000 and 60,000.

2. A p-substituted homopolymer as in claim 1 wherein the styrene compound is styrene.

3. A p-substituted homopolymer as in claim 1 wherein the p-substituent is an alpha-hydroxy ethyl radical.

4. A process which comprises reducing at temperatures between room temperature and 100° C. under pressures of less than 10 atmospheres a p-acylated homopolymer of a styrene compound of the group consisting of styrene and alpha-methyl styrene, said homopolymer being substituted on the para-positions of 50–100% of the aromatic rings with an aliphatic acyl hydrocarbon radical containing 2–24 carbon atoms, said homopolymer before substitution on the para-positions having a molecular weight between about 10,000 and 60,000 whereby the p-acylated homopolymer is reduced solely in the acyl groups.

5. A process which comprises subjecting to the action of lithium aluminum hydride at reflux temperatures a p-acylated homopolymer of a styrene compound of the group consisting of styrene and alpha-methyl styrene, said homopolymer being substituted on the para-positions of 50–100% of the aromatic rings with an aliphatic acyl hydrocarbon radical containing 2–24 carbon atoms, said homopolymer before substitution on the para-positions having a molecular weight between about 10,000 and 60,000, whereby the p-acylated homopolymer is reduced solely in the acyl groups.

References Cited in the file of this patent

UNITED STATES PATENTS

| | | |
|---|---|---|
| 2,534,193 | Emerson | Dec. 12, 1950 |
| 2,575,404 | Guest et al. | Nov. 20, 1951 |
| 2,576,311 | Schlesinger | Nov. 27, 1951 |
| 2,642,398 | Butler | June 16, 1953 |

OTHER REFERENCES

"Reduction of Organic Compounds by Lithium Aluminum Hydride," Nystrom et al., Jour. of Amer. Chem. Soc., May 1947, vol. 69, pp. 1197–1199.